Feb. 25, 1936.   R. J. MATHIAS   2,031,967
THERMOELECTRIC MOTOR GENERATOR
Filed Nov. 26, 1934   2 Sheets-Sheet 1
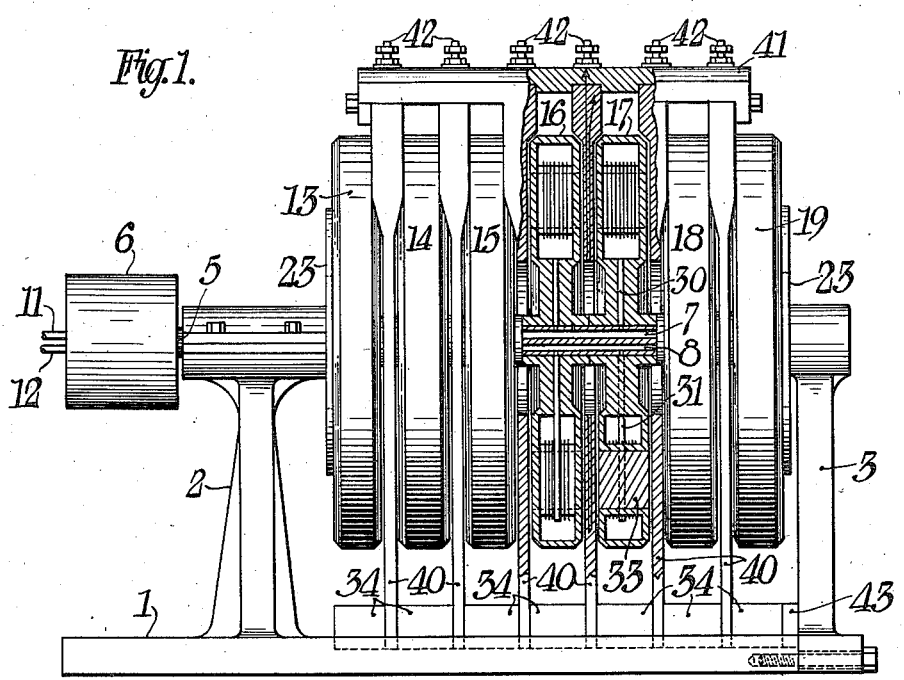
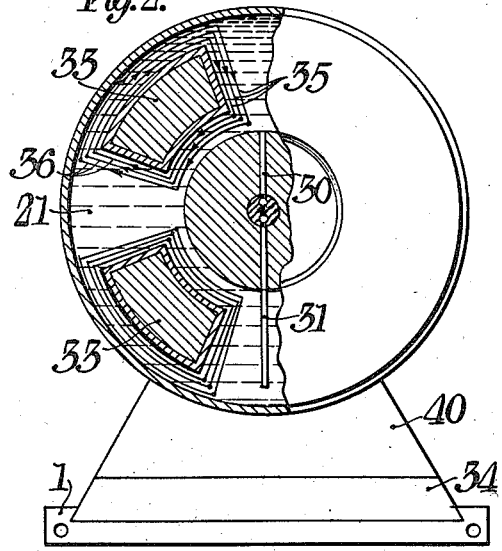
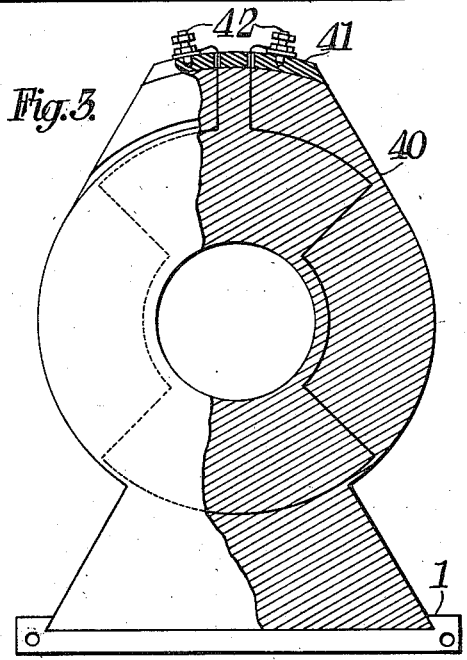
Inventor:
Robert J. Mathias Feb. 25, 1936. R. J. MATHIAS 2,031,967
THERMOELECTRIC MOTOR GENERATOR
Filed Nov. 26, 1934 2 Sheets-Sheet 2
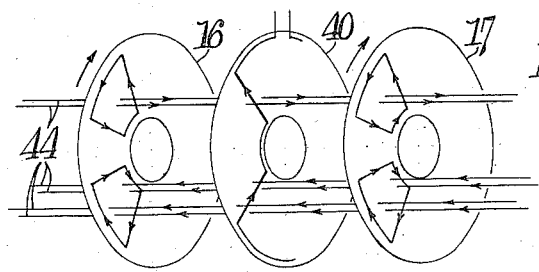
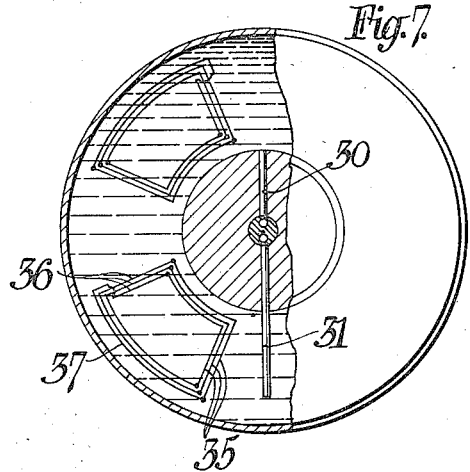
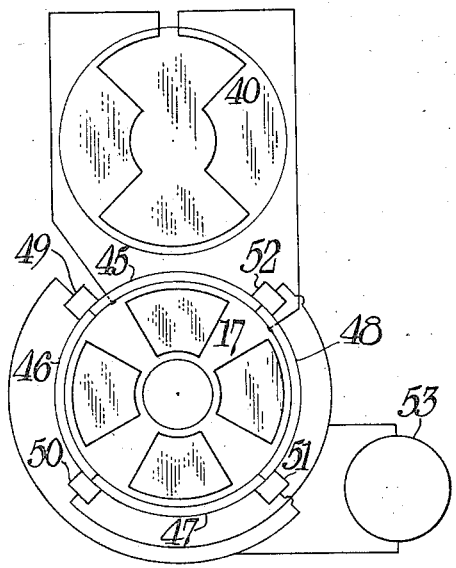
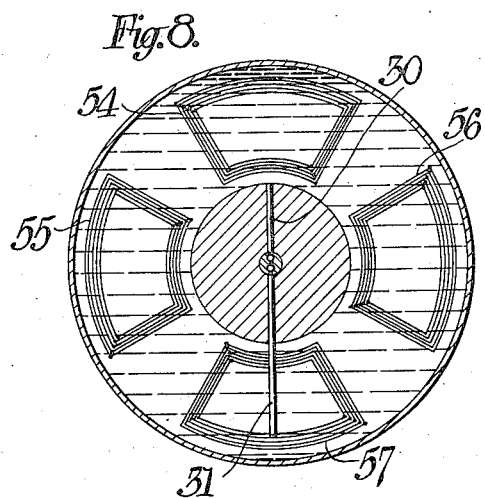
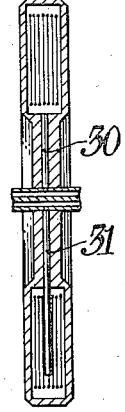
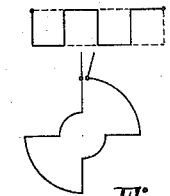
Inventor:

Patented Feb. 25, 1936

2,031,967

UNITED STATES PATENT OFFICE 2,031,967

THERMOELECTRIC MOTOR-GENERATOR

Robert J. Mathias, Cincinnati, Ohio

Application November 26, 1934, Serial No. 754,926

4 Claims. (Cl. 171—252)

This invention relates to electric motors and generators; and more particularly to a thermo-electric machine, wherein, through the useful formation, arrangement and utilization of thermo-couples, the field of an electric motor or generator is electrically self-excited and wherein the resultant machine may function as an electric motor or generator.

The design of electric motors and generators in everyday use is widely understood and these machines may easily be had in a wide variety of type, size, shape and efficiency—and to operate also under diverse conditions and requirements.

Similarly, the actions and characteristics of thermo-couples are well known and some discussion of this subject has been included as a part of my application, Serial Number 754,925 for Centrifugal thermo-electric machine, of even date, to which reference is made.

The machine of this invention however, is unique in that the field is created through an adaptation and use of thermo-couples, and contrary to the orthodox fashion of often receiving electric energy through connection with the armature or other outside source—the field is capable of supplying electricity, in addition to providing its own excitation. Moreover, the design is unique in that the alternate placement of rotor and stator sections is such as to constitute somewhat of a multi-stage motor or generator.

In a simple embodiment of my invention, I arrange a series of thermo-couples in coil form so as to approximate a field coil typical of those of many machines in present day use. Placing four of these coils equally distant angularly about an axis, with the coils alternating in polarity, constitutes a field of the machine. Adjacent to this field axially I place an armature whose conductors may cut or be cut by lines of force set up by the field. Additional fields and armatures are added, and the final structure comprises a machine capable of useful operation when the necessary energy of suitable type is supplied.

It is an object of my invention to provide a novel thermo-electric motor-generator. A further object is to provide such a motor-generator utilizing thermo-couples. Other objects will appear hereinafter.

In the accompanying drawings, in which like reference numerals refer to like parts:

Figure 1 is a side view of the machine, with certain parts shown in section,

Figure 2 is a transverse partially sectional view of a rotor unit,

Figure 3 illustrates a stator unit, with part shown in section,

Figure 4 is a diagrammatic sketch showing the relation of lines of force, rotor and stator windings, Figure 5 illustrates a comparison of an armature winding developed as a rectangle and as a circle.

Figure 6 illustrates a wiring diagram, and a relation of stator, rotor and commutator for using or producing direct current, Figure 7 illustrates a modified winding of the quadrants for the rotor units, and Figure 8 and Figure 9 are sectional views illustrating the use of a liquid to constitute the core of a field coil.

The design of the base, pedestals and rotor of this machine follows closely that explained in the drawings and specification for the machine in my application, Serial Number 754,925 of even date, to which reference is made.

A base 1, and pedestals 2 and 3 support the main structure of the machine. A shaft 5, drilled longitudinally as shown, carries rotors 13, 14, 15, 16, 17, 18 and 19 keyed thereon. A pulley 6 is keyed to the end of the shaft 5.

Supply pipes 11 and 12 are screwed into the ends of the shaft 5 and connect with conduits 7 and 8 in the shaft. Supply pipes 11 and 12 are journalled so as to permit passage of fluid through them, while shaft 5 is revolving.

Located radially in the hubs of the rotors 13, 14, 15, 16, 17, 18 and 19 are conduits 30 and 31, connecting through ports in the shaft 5, with passageways 7 and 8.

Cast in the bakelite rotor units, 13—19, are soft iron cores 33. Four of these cores are molded in each rotor unit, each 90° from the other, but for clarity in the drawings, only one core is shown, in section in rotor unit 17 of Figure 1; two are, of course, shown in section in Figure 2. In Figure 7 I have illustrated modified winding for the quadrants.

On the two end surfaces of the complete rotor unit are attached soft iron rings 23, which serve as a path for magnetic flux hereinafter described, and through which the magnetic lines of force leaving a core of one polarity, may return to and through adjacent cores of opposite polarity.

The construction of these thermo-couple units is essentially one of thousands of turns of very small wire, or stripping about a core. Suitable materials from which thermo-couple elements may be made are: copper, bismuth, iron, constantan, lead, silver and many other metals and alloys, joined in pairs, such as copper-iron, and in this machine the two different metallic elements used are 35 and 36. The form of the elements may be that of wire, thin stampings from the sheet metal, or other adaptable shapes and cross-sections. Junctions may be formed through welding, soldering, or mechanically fastening the ends of the two different metals together. These thermo-couple loops are all electrically insulated from each other; one form of insulation which may be employed is that of completely covering each loop or turn with insulating enamel or varnish.

To one skilled in the art, the winding, insulation and formation of these coils is similar to that employed in the manufacture of multitudes of coils, solenoids and other windings in present day use, and by one versed in that art, the construction of the thermo-couple units described may readily be accomplished.

These thermo-couple units are represented conventionally in rotor units 16 and 17 of Figure 1, and are indicated diagrammatically in Figure 2.

In Figure 2, encircling core 33, is illustrated a quadrant or unit of thermo-couple circuits (referred to as quadrants 33) each consisting of but the two elements 35 and 36. Junctions are indicated at the black dots. The small arrows on these circuits indicate the flow of current when, as a hypothesis, it is assumed that inner junctions of these thermo-couple units are the "hot" junctions, as opposed to the "cold" junctions as the outer or larger diameter. In the upper thermo-couple unit, 33 of Figure 2, the flow of current is clockwise, as viewed in the drawings.

In the lower quadrant 33 of Figure 2, the current flows counter-clockwise in the circuit, as viewed in the drawings.

In the modified windings for the quadrants as shown in Figure 7, the thermo-couples are series connected in each quadrant 37. The current in the quadrants flows clockwise in one quadrant and counter-clockwise in the next quadrant—the same as in Figure 2. In other words, the flow of current in alternate quadrants is always opposite.

In Figure 1, the thermo-couple units and quadrants in rotor 16 and in the upper half of rotor 17 are shown mounted at the correct angle. The lower quadrant of rotor 17, however, is advanced a few degrees merely for the purpose of showing it in section, it being understood that this is for illustration only. Actually the quadrants are always 90° apart and the flow of current in adjacent quadrants is always in opposite directions. All rotor units of the machine are mounted on the shaft so that the relative portion of similar poles or quadrants in different rotor units is exactly the same with respect to the vertical axis thru the center of the rotor units.

Insulating spacer blocks of hard material are shown at 34. These blocks serve to properly space the stator units of the machine.

Inserted between spacer blocks 34, and between rotor units 13—19, are six bakelite stator units 40. All stator units are practically identical and carry the same designating number 40. These stator units are suitably braced and spaced at the top by means of a spacing hood 41. This hood 41, is made of electrically non-conducting material, such as fiber.

Each stator unit 40, carries within itself a wire circuit indicated diagrammatically and connected to terminals 42. The radial elements of this circuit are 90 degrees apart. To one versed in the art, the construction of a winding from the diagram may readily be accomplished. The ends of the circuit connect to terminals 42. In Figure 1, only one terminal is shown, whereas for clarity, the positions of others are indicated by the center lines at the top of the stator units. To incorporate the circuit in a stator unit, the winding may be either molded in a bakelite casting of the stator unit; or, much more preferably, the stator unit may be made from soft iron, and the winding insulated and wedged within slots cut in proper shape and depth into the stator unit. This slotting and wedging, as in the construction of the winding above-mentioned, is well understood by those skilled in the art of manufacturing electrical machinery, and so is not elaborated on here.

Mention is also made that the bearing pedestal 3, is cast with a boss 43, which is machined to fit into the recess of base 1, and holds the spacer blocks 34 and stator units 40, tightly together and in proper position.

Referring for the moment to Figure 8 and Figure 9, there is illustrated here a variation in the construction of a rotor unit. The four quadrants of thermo-couple units 54, 55, 56 and 57 are shown mounted in a rotor unit. These thermo-couple units are not wound about an iron core, but have been formed, electrically insulated, and molded or cast into the rotor unit, without a core. This formation, insulation, and molding has already been discussed elsewhere in this application and further explanation of these operations is not needed here.

But, if the fluid used in centrifuging in this machine consists of mercury, or other suitable metallic fluid, this fluid in addition to serving as a medium for heat exchange, may also supply each coil winding with a metal core, for use as hereinafter described.

Referring now to the operation of the machine:

The opposite thermo-couple junctions are first maintained at different temperatures, and in the form of machine described in this application, the method of centrifuging a fluid as explained in my application, Serial Number 754,925, of even date, is used to do this. Power is supplied at pulley 2, and fluid of the useful different temperatures supplied through the passageways 7 and 8. By creating these temperature differences at inner and outer junctions, electric currents are set up within the thermo-couple assemblies, in quadrants 33 (or quadrants 37 if the modified winding is used). As current flows in these coils, magnetic lines of force are set up about the groups of thermocouples forming the coil. These lines of force take for a part of their path, the iron cores 33, contained within the thermo-couple coils and give the cores a polarity dependent on the direction of the current in the thermo-couples.

Since each rotor unit has its four quadrants in exactly the same relation with respect to a vertical line through the center, the lines of force will tend to form a straight line through the cores of corresponding quadrants of all the rotors. This tendency is illustrated in principle in the diagram of Figure 4. In this diagram, two successive rotors are numbered 16 and 17. For the sake of clarity, only two adjacent quadrants in each rotor are indicated. Lines of force are indicated by the straight lines 44. It will be observed that through the corresponding upper quadrants, the lines of force are in a direction pointing right.

whereas those of the lower corresponding quadrants are in a direction pointing left. In the complete machine, these magnetic lines of force are really of but one circuit, the lines leaving the cores of one quadrant, and returning by means of rings 23 through the adjacent quadrants.

Inasmuch as the rotor is forced to revolve, these lines of force move with the coils creating them. direction of revolution is indicated immediately above the rotor units. A stator 40 is located between rotor units 16 and 17. As the lines of force 44 revolve about the axis of the shaft with their corresponding quadrants, these lines cut the radial sections or armature conductors of the stator winding and create therein a current, dependent on which way the lines of force travel that are cutting the conductors. At the instant represented in the diagram by the positions of rotor quadrants and with motion continuing in the direction indicated above the rotor, a current will flow in the stator winding in the direction of the arrows on the radial elements of the stator winding. At 90 degrees of rotor revolution later, the current will be flowing in the opposite direction in the stator or armature winding. This reversal or alternation of current will continue as long as the rotor revolves and the machine therefore becomes a generator of alternating electric current and produces current of a frequency or reversal twice that of the number of revolutions the rotor is turning in the same unit of time. Although but one stator winding is illustrated in the diagram, a simultaneous flow of current occurs in all stator windings as the rotor of the machine revolves, and if the stator windings be connected in parallel, a single alternating current proportionately greater will be available in one circuit.

Now this operation is also reversible, in that, if an alternating current be supplied to the stator terminals, which current has a frequency of reversal twice that of the number of revolutions it is desired that the rotor turn in the same unit of time, then mechanical power will be available at the pulley 6, and the machine functions as a synchronous electric motor.

Throughout the drawings of this machine, the windings of both rotor and stator units are only indicated diagrammatically, and if actual windings of only the number of turns indicated, were used, the machine would hardly function. However, to one skilled in the art of electric motor and generator design, these diagrams are ample indication from which to design a useful operating machine.

Texts on motor-generator design frequently illustrate windings in the form of a rectangular development. The machine of this application differs somewhat from the orthodox machine in that the pole faces lie in a plane circular surface, rather than in cylindrical surface. The analogy, however, between the two forms of windings is shown in Figure 5; wherein the length of the rectangle represents 360°, the upper and lower sides of the rectangle are analogous to outer and inner circumferences respectively of the circle below.

The operation thus far described explains the machine as it produces or uses alternating current. An alternating current may be converted into a direct current by several known methods, one of which is through use of a commutator and brushes. In Figure 6, is illustrated diagrammatically the relative radial positions of a stator unit 40 of this machine; a rotor unit 17; a commutator with four segments 45, 46, 47 and 48; four stationary brushes 49, 50, 51 and 52; and a complete circuit of wiring, connecting with 53, which may represent as hereinafter described either a load or a current supply.

The normal position of the stator 40 should be that centering on the same axis as rotor 17, and adjacent to it axially. To avoid confusion and make for clarity, the stator 40 in this diagram is shown above the rotor 17, but in the same relation radially with respect to a vertical line through the centers, as it would have in its normal position axially.

For diagrammatic purposes also, the commutator with segments 45, 46, 47 and 48 is shown as mounted on the outer periphery of the rotor 17, and is to be considered as turning with it. This necessitates in an actual construction the use of slip rings and brushes as a connecting medium between moving commutator segments and stationary stator windings, but this feature is omitted in the diagram for sake of clarity. The actual mounting of the commutator on the machine may be elsewhere on the rotor shaft. A suitable commutator for efficient operation may readily be constructed from this diagram by one skilled in the art.

Briefly explaining the operation according to Figure 6; when a current is generated in the armature winding of the stator 40, as described previously, it has for a circuit, paths leading to segments 45 and 48. As these segments 45 and 48 turn with the rotor 17, each is always in contact for approximately 90° of rotor revolution, through two brushes of opposite pairs 49, 51 and 50, 52, with the outside load 53. The resultant flow of current to this load will be seen to be a direct current. At the instant of revolution from which the positions are drawn in the diagram, the commutator segments are short-circuited. But also at that instant, the stator or armature conductors are midway between opposite magnetic fields and no current is flowing therein. The theory of commutation is well understood by those versed in the art and more elaborate explanation of the principles is not necessary here.

The diagram refers to but one stator and rotor unit. All stator units of the machine may be connected in parallel with the one shown, and the principle of operation will be unchanged.

As in the previous use of alternating current, the generator action just described is also reversible; so that, if 53 is considered as representing a source of direct current, then, through commutation indicated in the diagram, the flow of current will always be such in the stator windings as to create useful physical reaction or motor effect in the machine when the rotor fields are suitably excited.

Furthermore, if I include in the machine of the instant invention, rotors of the direct current generating type, such as shown in my application Serial Number 754,925 together with slip rings and contact fingers for taking off direct current from the rotors or some of them, I may use this supply of direct current as the source 53 represented in the instant invention (Figure 6). The machine then comprises a motor wherein heat energy supplied in the fluid is the source of the energy supply and the power available at the pulley is the energy output.

Although above I have described the rotors and stators as made of bakelite, it will be apparent that they may similarly be made of any suitable insulating material capable of being cast or molded, such as glass, cellulose acetate or the like, all as well known to those skilled in the art of molding.

What I claim as my invention and desired to be secured by Letters Patent of the United States is:

1. An electric dynamo comprising a stationary armature unit in which electric current may be induced and from which electric current may be withdrawn, and a rotatable field unit in closely spaced relation to said armature, said field unit comprising a casing containing a fluid and containing four quadrants of thermo-couples located 90° apart, one set of junctions of each quadrant being located near the periphery of said casing and the other set of junctions of each quadrant being located near the center of said casing.

2. An electric dynamo comprising a stationary armature unit in which electric current may be induced and from which electric current may be withdrawn, the winding of the armature including two opposite quadrants, and a rotatable field unit in close parallel relation to said armature, said field unit comprising a casing containing a fluid and containing four quadrants of thermo-couples located 90° apart and centered annularly approximately the same as the quadrants of the armature, one set of junctions of each quadrant being located near the periphery of said casing and the other set of junctions of each quadrant being located near the center of said casing.

3. An electric dynamo comprising a shaft and means for rotating the shaft, a relatively thin stationary armature unit in which electric current may be induced and from which electric current may be withdrawn, centered with respect to said shaft, the winding of the armature including two opposite quadrants, a relatively thin rotatable field unit mounted upon said shaft in close parallel relation to said armature and comprising a casing containing a fluid and containing four quadrants of thermo-couples located 90° apart and centered annularly approximately the same as the quadrants of the armature, one set of junctions of each quadrant being located near the periphery of said casing and the other set of junctions of each quadrant being located near the center of said casing, and openings in the shaft and casing for introducing hot fluid thereto and openings in the shaft and casing for removing cold liquid therefrom.

4. In an electric dynamo, an armature, and field coils symmetrically spaced about the axis of the dynamo and in closely spaced relation to the armature, said field coils each comprising a system of thermo-couples, and means for thermally energizing said coils.

ROBERT J. MATHIAS.